Patented Sept. 12, 1922.

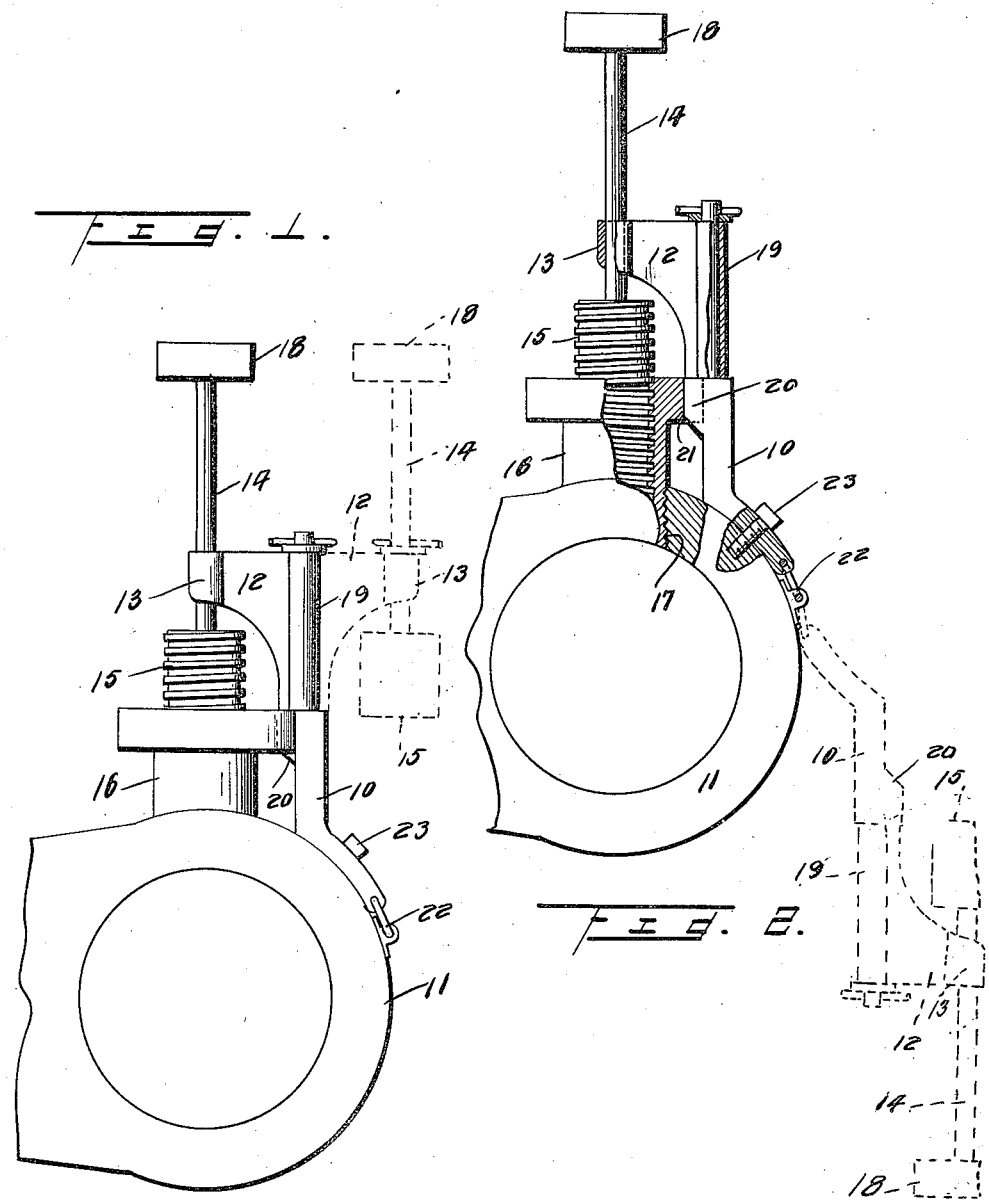

1,429,115

UNITED STATES PATENT OFFICE.

LAMONT H. STROUD, OF SHERIDAN, WYOMING.

NONDISPLACEABLE GREASE CUP AND BUSHING ANCHOR.

Application filed June 21, 1921. Serial No. 479,231.

*To all whom it may concern:*

Be it known that I, LAMONT H. STROUD, a citizen of the United States, residing at Sheridan, in the county of Sheridan and State of Wyoming, have invented certain new and useful Improvements in a Nondisplaceable Grease Cup and Bushing Anchor; and I do hereby declare the following to be a full, clear, and exact description of the invention, such as will enable others skilled in the art to which it appertains to make and use the same.

The object of the invention is to provide a simple, inexpensive and efficient device whereby the displacement or loss by reason of vibration of grease plugs used in connection with lubricating devices of connecting rods and the like, and the corresponding displacement or loss of bushings in which the hard oil or grease is placed for lubricating the journals may be prevented without material modification of either the ordinary lubricating means or of the connecting rod or other rod in connection with which the same may be employed; and with this object in view the invention consists in a construction, combination and relation of parts of which a preferred embodiment is shown in the drawing, wherein:

Figure 1 is an elevation of a device embodying the invention applied in the operative position to a connecting rod journal and showing in dotted lines the displaced arrangement of the grease plug to permit of filling the bushing.

Figure 2 is a similar view partly in section of the same showing in dotted lines the displacement of the brackets to permit of removing or replacing the bushing.

The device consists essentially of a bracket having an attaching arm 10 adapted to be secured to the connecting rod 11 or any other like element of a machine to be lubricated and which in practice is subjected to considerable vibration likely to cause displacement of the lubricating element, said attaching stem carrying a supporting arm 12 provided with a suitable guide 13 for the reception of the stem 14 of a grease plug 15. This grease plug as in the ordinary practice is threaded for engagement with the interior threads of a bushing 16 ordinarily threaded into an opening 17 in the connecting rod and adapted to contain grease to be forced to the bearing or journal by the screwing down of the plug 15. The outer end of the stem 14 is preferably provided with a head 18 constituting a grip or handle by which the plug may be turned and in practice it is preferable to swivel the arm 12 upon the attaching arm 10 by providing the latter with a spindle portion 19, so that when it is desired to fill or replenish the bushing, the plug may be unscrewed therefrom and then swung laterally out of alignment with the bushing as indicated by the dotted lines in Figure 1.

Moreover it is desirable in order to prevent the unscrewing of the bushing to provide the attaching stem 10 with a laterally projecting tooth 20 for engagement with a notch 21 in the flange of the bushing and in order that the bushing may be released to permit of its removal the arm 10 may be hinged as indicated at 22 and provided with a set screw 23 to normally hold it in position for engagement of the tooth 20 with the bushing. By loosening the set screw 23 the bracket may be swung outwardly as indicated in Figure 2 to permit of the removal of the bushing.

Having thus described the invention, what I claim is:—

In combination with a journal and a grease cup having a feeding stem and a notch, a bracket hinged to the journal and having an upstanding portion, a lug on said portion, means detachably securing the bracket to the journal against swinging movement relative to the latter and to hold the lug in the notch.

In testimony whereof I affix my signature in presence of two witnesses.

LAMONT H. STROUD.

Witnesses:
T. A. MORRIS,
OSCAR G. WAGNER.